Figure 1:
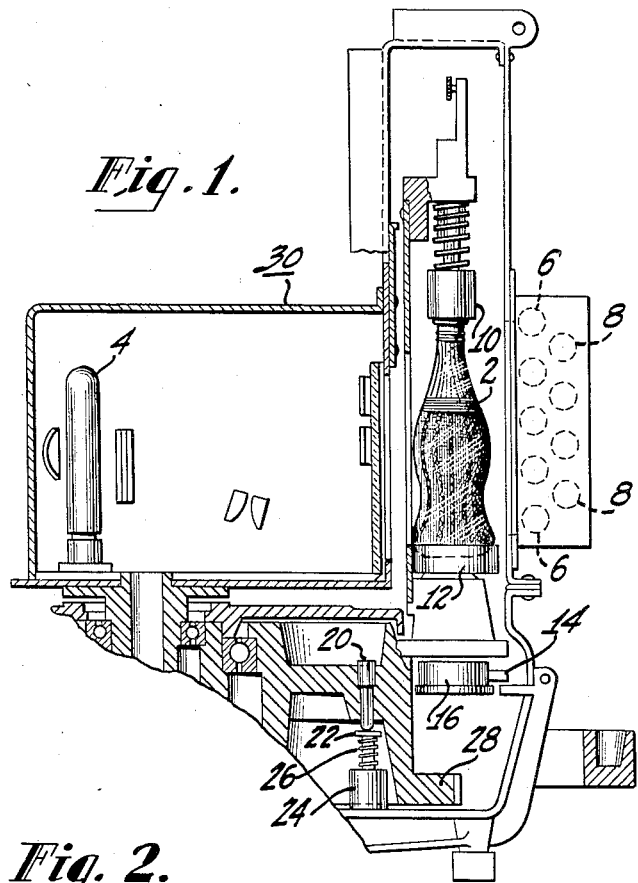

April 13, 1948.    R. E. SCHELL    2,439,490
CHECK CIRCUIT FOR INSPECTION APPARATUS
Filed Nov. 27, 1946    2 Sheets-Sheet 1

Inventor
Roger E. Schell
By
Attorney

April 13, 1948.        R. E. SCHELL        2,439,490
CHECK CIRCUIT FOR INSPECTION APPARATUS
Filed Nov. 27, 1946        2 Sheets-Sheet 2
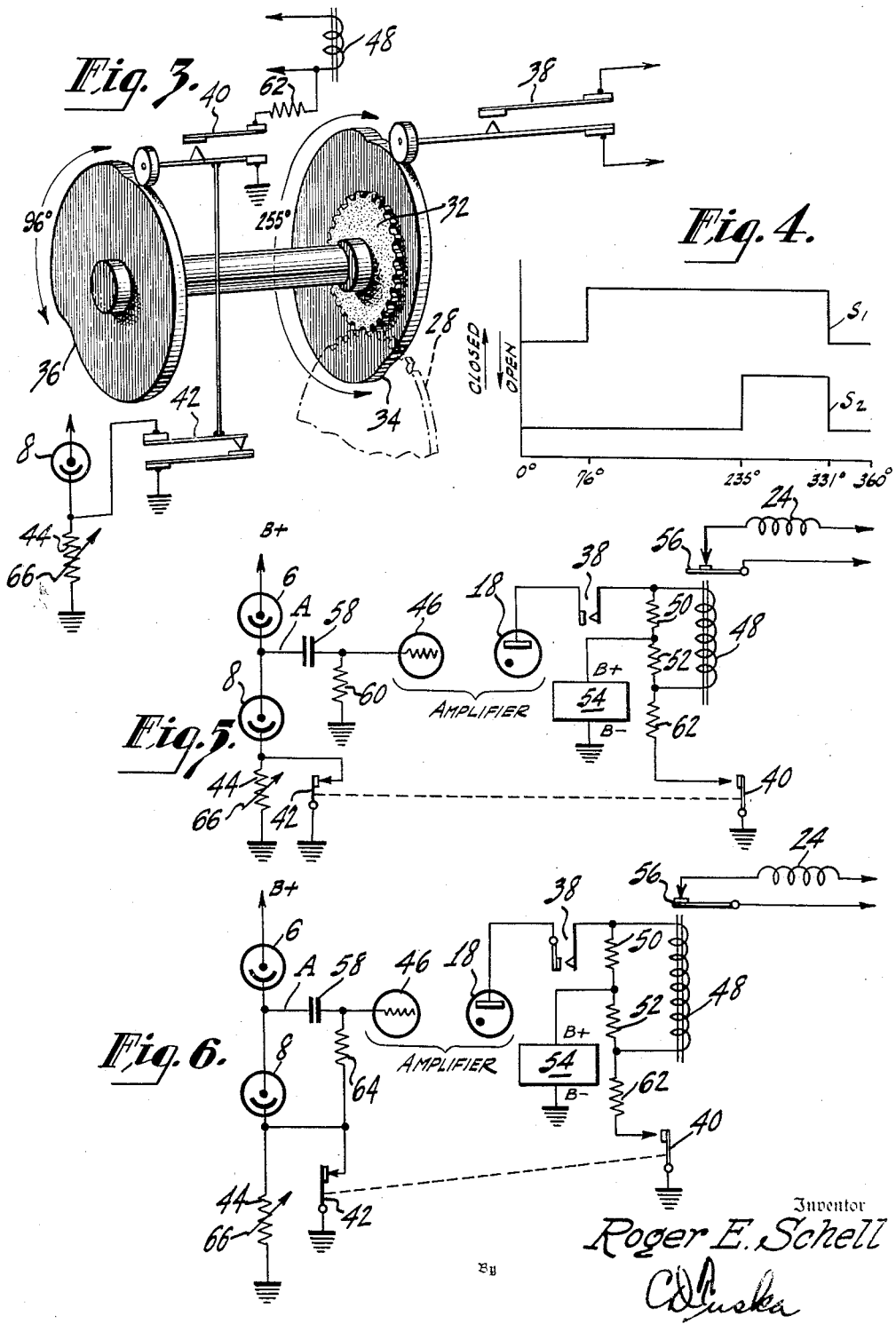

Patented Apr. 13, 1948

2,439,490

UNITED STATES PATENT OFFICE 2,439,490

CHECK CIRCUIT FOR INSPECTION APPARATUS

Roger E. Schell, West Collingswood, N. J., assignor to Radio Corporation of America, a corporation of Delaware Application November 27, 1946, Serial No. 712,561

10 Claims. (Cl. 250—41.5)

1

This invention relates to inspection apparatus employing photoelectric devices, and, more particularly, to an improved check circuit for a bottle inspection apparatus which will cause the apparatus to reject all of the bottles in case there should be any flaw in the functioning of any portion of the inspection mechanism such as the inspection lamp, photocells, optical system, or amplifier.

In general, the circuit of the present invention is an improvement on the apparatus including the check circuit described and claimed in Weathers Patent No. 2,323,636 and is intended for use in inspection machines of the class described in Stout Patent No. 2,132,447. The apparatus of the Stout patent is intended to be used for the continuous inspection of bottles filled with a beverage in which there may be floating, or settled on the bottom, particles of foreign matter inadvertently admitted during one or more stages of the bottling process before capping. During the inspection process, each bottle and its contents is first rotated. The rotation of the bottle is then stopped and the still rotating contents are inspected by passing a light beam through to a bank of photoelectric cells. Impulses from the photoelectric cells are then passed through an amplifier such, for example, as described and claimed in Weathers Patent No. 2,192,568. Foreign material, rotating with the contents of the bottle, causes corresponding variations in the strength of the light beams. These variations result in impulses of current being given out by the photocells. The impulses are amplified by the amplifier and, in turn, actuate a tripping mechanism which rejects the bottle having the substandard contents.

In the aforementioned Weathers Patent No. 2,323,636, apparatus is provided for causing the rejection of a bottle which is inspected during a period of faulty operation of the amplifier, optical system, light source, or other accessory mechanism. This is a protective feature to make doubly certain that no bottle containing unwanted foreign matter is passed through the apparatus, along with the bottles which have passed the required test, while the inspection mechanism is not functioning properly. The successful operation of the apparatus described in the said Weathers patent depends on the exact and proper placement of a cam switch which in turn controls the operation of two relays connected to the rejection mechanism. If the cam switch is not precisely regulated, an excessive number of false rejections may occur. That is, some

2 bottles which are really above the established standard will be rejected along with bottles which are below the standard.

One object of the present invention is to provide improved inspection apparatus which will cause to be rejected any object inspected during a period when any part of the inspection system is not functioning properly.

Another object of the invention is to provide, in a bottle inspection apparatus, means for rejecting a bottle having a greater than desired degree of opaqueness.

Another object of the invention is to provide means for minimizing variations in the operation of reject mechanism of an inspection apparatus brought about by variations in the ratio of the intensity of light falling on each of two banks of photocells.

Still another object of the invention is to provide means for minimizing variations in the operation of reject mechanism of an inspection apparatus brought about by variations in sensitivities of the photocells used.

Figure 2:
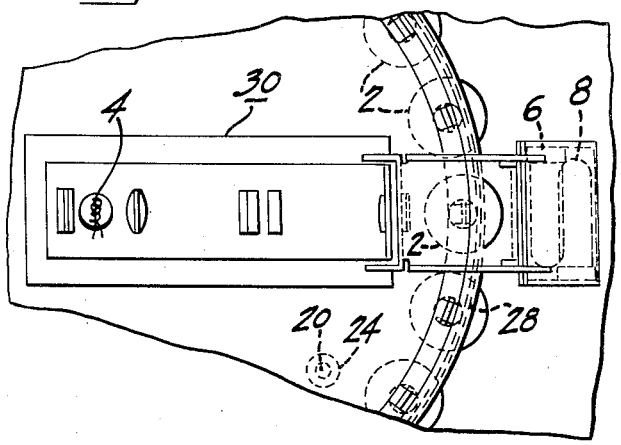

These and other objects of the invention will be apparent from a reading of the following specification and an inspection of the accompanying drawings in which:

Fig. 1 is a vertical sectional view through the apparatus at the inspection station, Fig. 2 is a plan view, partly in section, through the apparatus at about the middle of Fig. 1, Fig. 3 is a detail view of part of the cam switch mechanism, Fig. 4 is a graph showing the cycle of operation of the switch mechanism of Figs. 3 and 5, Fig. 5 is a schematic diagram of one embodiment of an improved check circuit made use of in the present invention, and Fig. 6 is a schematic diagram of another embodiment of an improved check circuit utilized in the present invention.

In order to explain their operation as clearly as possible, the improvements which are a part of the present invention will be described in connection with the operation of a machine for inspecting the contents of bottles. The type of machine used for purposes of illustration will be that described generally in the previously mentioned Stout Patent No. 2,132,447.

With particular reference to Fig. 1, a bottle 2 to be inspected is brought into position between a suitable light source such as a lamp 4 and a photosensitive element such as two banks of photocells 6 and 8. Although it is preferred to use banks of cells, a single photocell or a single pushpull photocell of the barrier layer type may be substituted. An optical system such as that shown in Sachtleben Patent No. 2,192,580 may be used to direct desired amounts of light to various regions of the bottle for a more thorough examination.

Just before reaching the inspection station shown, the bottle, which is held firmly between an upper cup 10 and a lower cup 12, is caused to rotate rapidly. This also causes rotation of its contents. Upon reaching the inspection station, a brake 14 is applied to pulley 16 attached to the lower cup 12 causing the rotation of bottle 2 to be stopped abruptly but allowing the contents to continue to rotate for a time. Rotation of the bottle's contents stirs up any particles of foreign matter that may have settled to the bottom and, furthermore, causes all particles to pass rapidly back and forth through the inspection beams, thus producing a stronger signal in the detecting apparatus.

The presence of whirling particles of foreign matter in the rotating fluid contents of the bottle 2 causes variations to occur in the strength of the beam of light being transmitted from light source 4 to photocells 6 and 8, and these variations are translated into impulses of current by the photocells. These impulses are transmitted through an appropriate amplifier such as described in the previously mentioned Weathers Patent 2,192,568, the last tube 18 of which may be a cold cathode gas tube as described in Weathers Patent 2,323,636.

When the particles are larger than a certain predetermined minimum in size, the consequent amplified current impulses are sufficiently large to cause actuation of a reject pin 20. The reject pin 20 may be forced upward by a plunger 22 which is normally held in a downward position by a solenoid 24 through which current normally flows. If, for any reason, the current through the solenoid 24 ceases, the spring 26 pushes the plunger 22 upward, thereby causing the corresponding bottle to be rejected as described in the Stout patent referred to.

The bottle-holding cups 10 and 12, together with the optical system and photocells 6 and 8, are preferably mounted for convenience of operation and economy of space on a rotatable turret or turntable, part of which is indicated in Fig. 2. This turntable may be driven through a ring gear 28. Although mounted on the turntable, the light source 4, optical system, and photocells 6 and 8, are preferably not rigidly attached thereto but are carried by an arm 30 which is pivoted at the axis of rotation of the turntable and which swings, in its entirety. When the bottle being inspected reaches a point in its path at which it is aligned with the components of the inspection apparatus, the arm containing the inspection apparatus moves with the bottle through a predetermined angular distance while the bottle is being inspected, being locked to the turret during this period. At the end of the inspection period, the arm is released and swings back to its original position to travel along with the next bottle.

A suitable timing mechanism which may comprise a gear wheel 32 driven by the ring gear 28, and two synchronously driven adjustable cams 34 and 36 for opening and closing switch 38 as well as mechanically linked switches 40 and 42 synchronizes the operation of the inspection apparatus with the operation of the associated reject mechanism control circuits which will now be more fully described.

The reject mechanism control circuits illustrated in Fig. 5 have two principal functions. One of these is to actuate the reject mechanism, including the solenoid 24, plunger 22, and pin 20, previously described, when a signal of sufficient amplitude is received from photocells 6 and 8, due to presence of particles of foreign matter in the liquid being inspected. The other main function is to provide means for periodically applying a check signal to the reject relay mechanism which will cause the reject pin 20 to be actuated if any part of the inspection system is not working properly.

The first of the above described functions is performed during the inspection period when the light from source 4 is being passed through a bottle 2. During this period, the inspection arm 30 is moving forward with the bottle as it travels in its path around the turret, switch 42 is closed, short circuiting resistor 44, switch 38 is also closed, and switch 40 is open. When a particle of foreign matter of size greater than the predetermined minimum intercepts the light beams falling on banks of photocells 6 and 8, a potential appearing at point A is amplified by the amplifier, of which only the first tube 46 and the last tube 18 are shown. The tube 18 is preferably a cold cathode gas tube of the type known commercially as a Radiotron OA4G. The output circuit of the amplifier comprises a relay 48 shunted by resistors 50 and 52 in series, from the center tap of which an appropriate lead goes to the positive side of a power supply unit 54, the negative side of which is grounded. The relay 48 is provided with normally closed contacts 56 and if current flows through relay coil 48, these contacts 56 open. The contacts 56 are connected in series with the solenoid 24 (see also Fig. 1) and its power supply so that if current flows through the coil 48, the contacts 56 will be opened, current will cease flowing through the solenoid 24 and the reject pin 22 will be actuated by spring 26, thus operating further mechanism (not shown) which rejects the bottle.

Returning now to the input side of the amplifier, which has a blocking condenser 58 and a gridleak 60, a suitable potential impulse at point A will be amplified by the amplifier, the gas tube 18 will be fired and the circuit will thus be completed through switch 38, resistor 50 and power supply 54 to ground and back through ground to switch 42 and the photocells. At the same time, part of the current will flow through the relay coil 48, resistor 52 and power supply 54. Since current flows through coil 48, contacts 56 will be opened, current will cease flowing through solenoid 24 and the bottle being inspected will be thus rejected. When the contents of the bottle have either no foreign particles or particles smaller than the predetermined minimum suspended therein, the potential at A remains too low to cause firing of the gas tube 18, with the result that no current flows through coil 48, contacts 56 remain closed, and the reject mechanism remains unactuated, thus allowing the bottle to be passed to the normal collection station. This part of the operation is similar to that described in previous patents, for example, previously mentioned Weathers Patent No. 2,323,636.

The second of the referred to functions performed by the control circuits involves the improvements which are a part of the present invention. Just before the end of the inspection period, while switch 38 remains closed, switch 42 is opened and at the same time switch 40 is closed, the two switches being linked together mechanically such that these two operations are simultaneous. The opening of switch 42 removes the short circuit across resistor 44 and the current through the photocells 6 and 8 now flows through this resistor, causing a voltage drop across it. This disturbs the balance of the photocell system causing an increase of potential, with respect to ground, at point A. This voltage change is amplified by the amplifier in the normal manner and if of sufficient amplitude fires the gas tube, causing current to flow through the switch 38, resistor 50, and power supply 54 to ground. Current would also flow, as before, through coil 48 except that now since switch 40 is closed, an equal current will also tend to flow in the opposite direction through resistor 52 and will attempt to flow through coil 48 in a direction opposite to the current attempting to flow to the coil through switch 38. A balancing resistor 62, preferably placed between switch 40 and resistor 52, having the same value as the internal resistance of gas tube 18, is provided to help maintain the proper balance of currents flowing in the two circuits. Since these currents are equal and opposite, no current at all will flow through coil 48 and the contacts 56 will remain closed.

At the end of the inspection period, the swinging arm 30 holding the inspection system starts to move backward to inspect the next bottle while the first bottle continues to move forward. This relative movement of the bottle with respect to the inspecting beam of light also causes a signal in the form of potential impulses to appear at point A, and this signal, which is defined as the check signal, is amplified by the amplifier in the same manner as that due to the impulse received due to current beginning to flow across the resistor 44. However, since the gas tube 18 had been previously fired, current will simply continue to flow through it and the balance of the circuit associated with rejection relay 48 will not be disturbed.

As the inspection arm 30 continues to swing backward, the beam of light no longer intercepts the bottle which was just inspected and as this point is passed, switch 42 is closed, switches 38 and 40 are opened once more and the apparatus is ready to begin another inspection cycle when the arm 30 has swung back into its original position.

If any of the parts of the inspection system, such as the light source 4 or photocells 6 or 8 or the amplifier, or any of the switches, have failed or if any of the resistors 50, 52, or 62 in the rejection relay circuit has been burned out or is not otherwise functioning properly, the circuit through coil 48 will become unbalanced since no current will be flowing in the output circuit of the amplifier to balance the current tending to flow through coil 48 due to closing of switch 40. During the condition of unbalance, contacts 56 will remain open and every bottle will be rejected. Such a condition is quickly apparent to the operator who can then check to determine the cause.

The cycle of operation of the control switches is illustrated graphically in Fig. 4. In the figure, curve $S_1$ shows one complete cycle of operation of switch 38 while curve $S_2$ shows a similar cycle for switches 40 and 42. As illustrated by curve $S_1$, switch 38 is open at the beginning of the cycle and remains open during about 76° of rotation of the cam member 34, thereby giving the bottle time to be completely stopped after its period of rotation and the optical system and the bottle time to stop any vibration incident to the locking together of the inspection system and the rotary turret. Switch 38 then closes and remains closed until the cam unit 34 has rotated through an angle of 331° from its starting point at which time the switch opens and remains open during the rest of the rotation cycle of cam member 34. The period during which the switch is closed coincides with the entire inspection period of the cycle and the first part of the inspection arm return period. As shown in curve $S_2$, switch 42 is closed and switch 40 is open during about the first 235° of the cycle of rotation of cam member 36. The precise point is not critical here and a degree or two on either side does not affect the operation of the system. The switch 42 is then opened and switch 40 is closed until the cam member 36 has rotated 331° from its starting point whereupon switch 42 is again closed and switch 40 is opened, the two switches remaining in this condition throughout the remainder of the 360° cycle. The point at which switch 42 is opened and switch 40 is closed represents a point just before the end of the inspection period, which period ends at the 240° point. The period from 240° to 331° coincides with the first part of the time during which the inspection arm is returning to its starting point. It is during this part of each cycle that the check signal is applied due to relative movement of the bottle across the inspection beam.

The principal advantage of the present invention lies in applying an equivalent signal to the output circuit of the amplifier before the usual check signal is applied due to the backward movement of the inspection arm. In prior art devices, the switch connecting the balancing circuit had to be closed at the exact instant the inspection arm began its backward swing since both the amplifier output circuit and the balancing circuit, in the absence of the present arrangement, had to be closed simultaneously to prevent current from flowing through the reject relay coil and thereby operating the reject mechanism even when the inspection system was in otherwise perfect functioning order. The cutting and setting of the cams was very difficult and operational difficulties, due principally to unpredictable bottle rest position and spin as the bottom holding cup was released from the brake, resulted in an unduly high percentage of false rejections of bottles being inspected.

A somewhat different form of amplifier input circuit which may advantageously be used in the present invention is shown in Fig. 6. The operation here is substantially the same as that described in connection with Fig. 5. In this second embodiment, the gridleak resistor 64 of the first amplifier tube 46 instead of being grounded is tied back to the cathode of photocell 8. This minimizes variations in the amplitude of the potential impulses at point A caused by current beginning to flow through resistor 44 which in turn is caused by variations in the ratio of light falling on the two banks of photocells and on variations in sensitivities of photocells in the two banks.

In either of the two embodiments, there may be included means for adjusting the circuit to reject a bottle having a degree of opaqueness greater than a certain desired value. This may be conveniently accomplished by including means 66 for varying the resistance value of resistor 44.

It will be apparent from the foregoing description that when switch 42 is open, the amplitude of the signal at point A which is just sufficient, when amplified by the amplifier, to fire the gas tube, is dependent on the magnitude of the potential drop across resistor 44. For a given value of resistance in this resistor, this amplitude of signal is proportional to the photocell current. It is thus proportional to the light transmission of the bottle being inspected. By increasing the value of resistor 44, the apparatus can be made to pass bottles which are more opaque than, say, a certain average value. Conversely, by decreasing the value of resistor 44, the bottle would have to be less opaque in order not to be rejected.

There have thus been described certain improvements in the reject control circuits of an inspection machine using photoelectric devices which increase the stability of operation. Although described in connection with a machine for inspecting fluid contents of light transmitting bottles, the same improvements could be applied to other inspection machines giving regularly recurring signals synchronized by timing switches.

I claim as my invention:

1. In combination with an electrical impulse responsive circuit, means connected to said circuit for actuation on occurrence of a predetermined condition in said circuit, means for causing the occurrence of said condition at predetermined time intervals for predetermined lengths of time, a balancing circuit connected to said actuated means in opposition to said first circuit, means for both closing simultaneously said first circuit and said balancing circuit slightly in advance of the beginning of each of said predetermined lengths of time and keeping said balancing circuit closed throughout said predetermined lengths of time, and means for causing a condition in said impulse responsive circuit equivalent to said predetermined condition at the same time said impulse responsive and said balancing circuits are simultaneously closed.

2. In combination with an electrical impulse responsive circuit, means connected to said circuit for actuation on occurrence of a predetermined condition in said circuit, means for causing the occurrence of said condition at predetermined time intervals for predetermined lengths of time, a balancing circuit connected to said actuatable means in opposition to said first circuit, means for both closing simultaneously said first circuit and said balancing circuit slightly in advance of the beginning of each of said predetermined lengths of time and for keeping said balancing circuit closed throughout said predetermined length of time, and means for causing a condition in said impulse responsive circuit equivalent to said predetermined condition at the same time said impulse responsive and said balancing circuits are simultaneously closed, whereby if said impulse responsive circuit fails to operate during one of said predetermined lengths of time, the said actuatable means will be actuated.

3. The combination of an amplifier provided with an output circuit, and an amplifier check circuit including means for periodically applying a check signal to said amplifier, a balancing circuit adapted to balance the check signal in the said output circuit, means for both connecting said output circuit to said balancing circuit just prior to the application of said check signal and keeping said circuits connected during the application of said check signal, and means for applying a signal to said amplifier which is equivalent to said check signal at the same time said output and said balancing circuits are simultaneously closed.

4. The combination of an amplifier provided with an output circuit, and an amplifier check circuit including means for periodically applying a check signal to said amplifier, a balancing circuit adapted to balance the check signal in said output circuit, means for both connecting said output circuit to said balancing circuit just prior to the application of said check signal and keeping said circuits connected during the application of said check signal, means for applying to said amplifier a signal which is equivalent to said check signal at the same time said output and said balancing circuits are simultaneously closed, and means for restoring the amplifier and check circuit to their original condition.

5. In a photoelectric inspection device, an amplifier provided with an output circuit including means responsive to the current of said circuit, balancing means adapted to be connected to said circuit for rendering said output current responsive means unresponsive to said circuit, means for producing a signal in said circuit at predetermined intervals for predetermined lengths of time, switching means connected to said device for connecting said balancing means in said output circuit just prior to the beginning of each of said lengths of time and keeping it connected throughout said lengths of time, and means for providing a signal in said circuit equivalent to said first mentioned signal at the same time said balancing means is connected in said circuit.

6. In a photoelectric inspection device, an amplifier provided with an output circuit including means responsive to the current of said circuit, balancing means adapted to be connected to said circuit for rendering said output current responsive means unresponsive to said current, means for producing a signal in said circuit at predetermined intervals for pretermined lengths of time, means connected to said device for connecting said balancing means in said output circuit just prior to the beginning of each of said lengths of time and keeping it connected throughout said lengths of time, and means for providing a signal equivalent to said first mentioned signal at the same time said balancing means is connected in said circuit, said last mentioned means including means for varying the amplitude of signal in said output circuit which is required to render responsive said current responsive means.

7. The combination of an amplifier provided with an output circuit, means actuatable by current flowing in a certain part of said circuit, and an amplifier check circuit including means for periodically applying a check signal to said amplifier, a balancing circuit adapted to balance the check signal in said output circuit, means for both connecting said output circuit to said balancing circuit just prior to the application of said check signal and keeping said circuits connected during the application of said check signal, and means for applying to said amplifier a signal which is equivalent to said check signal at the same time said output and said balancing circuits are simultaneously closed, said last mentioned means including means for varying the amplitude of signal in said output circuit required to actuate said actuatable means.

8. The combination of an amplifier provided with an output circuit and an amplifier check circuit including means for periodically applying a check signal to said amplifier, a balancing circuit adapted to balance the check signal in said output circuit, means for both connecting said output circuit to said balancing circuit just prior to the application of said check signal and keeping said circuits connected during the application of said check signal, and means for applying to said amplifier a signal which is equivalent to said check signal at the same time said output and said balancing circuits are simultaneously closed, said last mentioned means including means for varying the amplitude of signal in said check circuit required to cause current to flow in said output circuit.

9. In a photoelectric inspection device, an amplifier provided with an output circuit including means responsive to the current of said circuit, balancing means adapted to be connected to said circuit for rendering said output circuit responsive means unresponsive to said current, means for producing a signal in said circuit at predetermined intervals for predetermined lengths of time, means connected to said device for connecting said balancing means in said output circuit just prior to the beginning of each of said lengths of time and keeping it connected throughout said lengths of time, means for providing a signal equivalent to said first mentioned signal at the same time said balancing means is connected in said circuit, and means for varying the amplitude of signal in said check circuit required to cause current to flow in said output circuit.

10. In a photoelectric inspection device including at least two banks of photocells, an amplifier provided with an output circuit including means responsive to the current of said circuit and an input circuit connected between said amplifier and said photocells, means for periodically applying a check signal through said input circuit to said amplifier and to said output circuit, stabilizing means included in said input circuit for minimizing variations in the amplitude of said check signal due to variations in the amount of current received from the different banks of photocells, a balancing circuit adapted to balance the check signal in said output circuit, means for both connecting said output circuit to said balancing circuit just prior to each application of said check signal and keeping the two circuits connected during the application of said check signal, and means for applying to said amplifier a signal which is equivalent to said check signal at the same time said output and said balancing circuits are simultaneously closed.

ROGER E. SCHELL.